United States Patent [19]
Dziegielewski

[11] Patent Number: 5,728,004
[45] Date of Patent: Mar. 17, 1998

[54] UNIVERSAL JOINT WITH LAYERED BUSHINGS

[75] Inventor: Thomas Dziegielewski, Rochester Hills, Mich.

[73] Assignee: Chrysler Corporation, Auburn Hills, Mich.

[21] Appl. No.: 726,875

[22] Filed: Oct. 4, 1996

Related U.S. Application Data

[63] Continuation of Ser. No. 271,316, Jul. 6, 1994, abandoned.

[51] Int. Cl.$^6$ ........................................ F16D 3/20
[52] U.S. Cl. .................. 464/70; 464/112; 464/125; 384/300; 384/908
[58] Field of Search .......................... 464/112, 119, 464/121, 122, 123, 70; 384/300, 908, 912

[56] References Cited

U.S. PATENT DOCUMENTS

| | | | |
|---|---|---|---|
| 1,590,992 | 6/1926 | Funnell. | |
| 2,689,755 | 9/1954 | Krotz | 267/272 X |
| 2,691,814 | 10/1954 | Tait | 384/300 X |
| 2,798,005 | 7/1957 | Love | 384/300 X |
| 2,809,130 | 10/1957 | Rappaport | 384/300 X |
| 2,997,864 | 8/1961 | Rueb | 464/112 |
| 3,120,744 | 2/1964 | Dunn | 464/122 |
| 3,267,696 | 8/1966 | Sieja | 464/70 |
| 3,406,534 | 10/1968 | Chapper | 464/119 X |
| 3,425,112 | 2/1969 | Roemer | 384/300 X |
| 3,461,688 | 8/1969 | Garfinkle | 464/125 |
| 3,533,668 | 10/1970 | Tunis, III | 384/300 X |
| 3,575,787 | 4/1971 | Pietrocini et al. | 384/300 X |
| 3,609,994 | 10/1971 | Colletti et al. | 464/122 X |
| 4,365,488 | 12/1982 | Mochida et al. | 464/132 |
| 4,830,933 | 5/1989 | Hodes et al. | 384/912 X |
| 4,846,590 | 7/1989 | Teramachi | 384/300 X |
| 4,941,766 | 7/1990 | Carlson | 403/131 |
| 5,229,198 | 7/1993 | Schroeder. | |
| 5,364,682 | 11/1994 | Tanaka et al. | 384/912 X |

*Primary Examiner*—Daniel P. Stodola
*Assistant Examiner*—William A. Rivera
*Attorney, Agent, or Firm*—Jennifer M. Stec

[57] ABSTRACT

A universal joint for a tilt steering column of a vehicle includes an intermediate cup pivotally coupled to an end of a driven shaft, and a bell yoke receiving the intermediate cup within a cavity of the bell yoke. A pin extends from the bell yoke into an aperture of the intermediate cup. A layered bushing is compressed between an end of the pin and the aperture of the intermediate cup. The layered bushing is comprised of a mesh main body having a radially inner sliding layer and a radially outer gripping layer.

6 Claims, 1 Drawing Sheet

U.S. Patent  Mar. 17, 1998  5,728,004
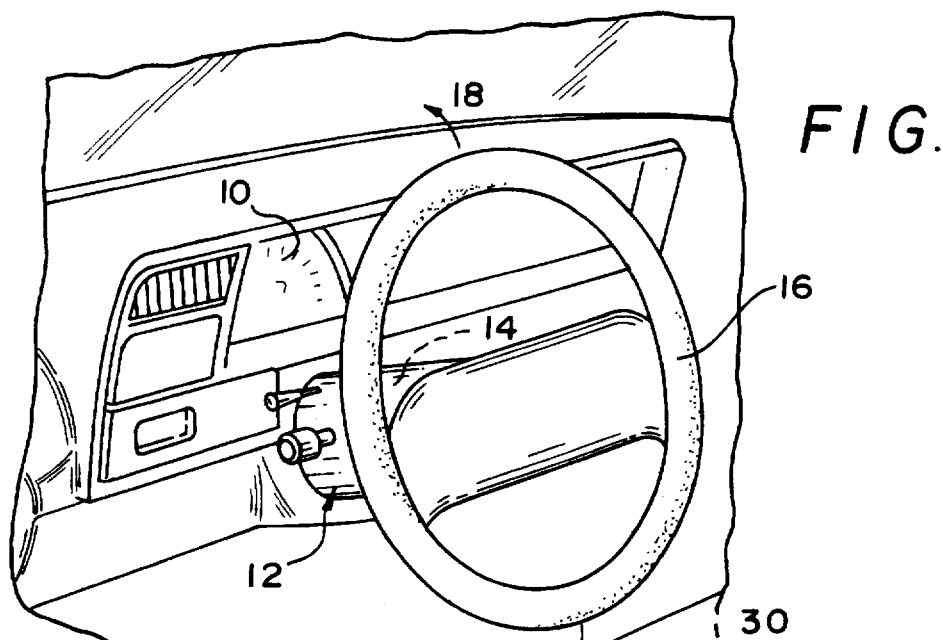
FIG. 1
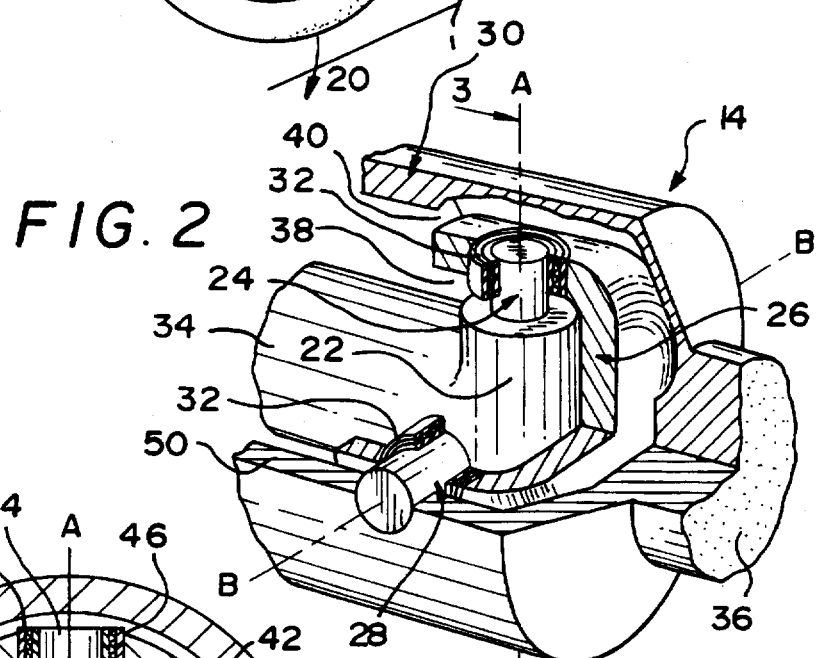
FIG. 2
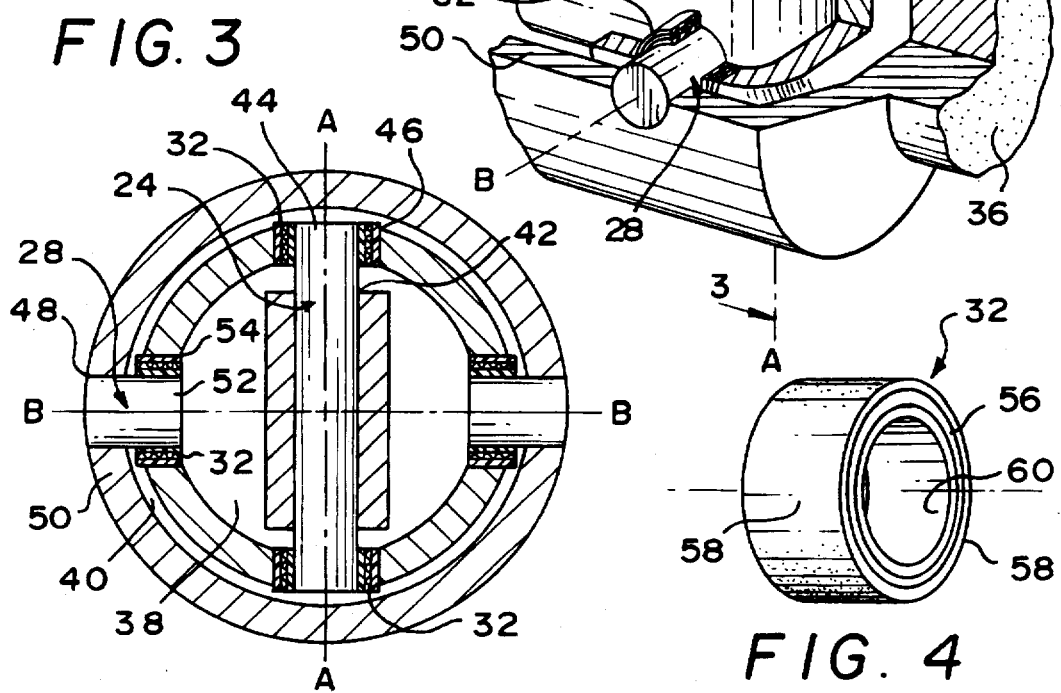
FIG. 3
FIG. 4

UNIVERSAL JOINT WITH LAYERED BUSHINGS

This application is a continuation of application U.S. Ser. No. 08/271,316 filed on Jul. 6, 1994, now abandoned.

BACKGROUND OF THE INVENTION

1. Field of the Invention

The present invention relates to a universal joint, and more specifically to a universal joint for use in a tilt vehicle steering column.

2. Background Art

Universal joints for use in a tilt vehicle steering column are well known. One such universal joint includes an intermediate cup pivotally coupled to an end of a driven shaft. The intermediate cup is received in a cavity of a bell yoke, which is at one end of a driving shaft. The intermediate cup is pivotally coupled to the bell yoke, such that rotation from the steering shaft is transmitted to the driven shaft even when the steering column is tilted. A plurality of pins provide the pivot connection between the intermediate cup, driven shaft and steering shaft. One portion of each pin is rigidly secured to either the driven shaft or the bell yoke of the steering shaft, while another portion of each pin extends into an aperture of the intermediate cup. For this type of universal joint, it is known in the art to interpose a ball bearing or conventional bushing between the pin and associated aperture in the intermediate cup. Ball bearings are prohibitively expensive, and generally require tight tolerances at the pivot connection.

Conventional bushings also have disadvantages, and typically require that the pin and corresponding aperture of the intermediate cup be manufactured to tight tolerances. Further, the intermediate cup must be made of a material that allows for pivoting with respect to the pin. However, the trend for steering columns is to use lighter and stronger materials. Prior art bushings are often not sufficiently versatile for the variety of materials being used in the universal joint.

For example, when the intermediate cup is formed of plastic, the intermediate cup slides smoothly and easily against the pin without a bushing. When other materials are used for the intermediate cup, such as metal, steering feels rough to an operator and lash will be present as the intermediate cup slides against the pin. Therefore, although metal is preferred for strength, the operation of the tilt steering is compromised.

It is therefore a goal of the present invention to provide a universal joint having superior performance which is manufactured at reduced cost. It is a further goal to provide a universal joint that includes a bushing able to be interposed between a variety of materials. It is a further goal of the invention to provide a universal joint having metal intermediate cup and a layered bushing for pivoting about a pin without lash.

SUMMARY OF THE INVENTION

A universal joint for a tilt steering column of a vehicle includes an intermediate cup pivotally coupled to an end of a driven shaft. The intermediate cup is received in a cavity of a bell yoke, which is at one end of a driving shaft. The intermediate cup is pivotally coupled to the bell yoke, such that rotation from the steering shaft is transmitted to the driven shaft even when the steering column is tilted. Pins extend from the end of the driven shaft and the bell yoke into apertures of the intermediate cup forming a pivot connection. A layered bushing is compressed between each end of the pins and associated aperture of the intermediate cup. The layered bushing is formed of a mesh main body, and includes a gripping layer along an outer diameter of the bushing and a sliding layer along an inner diameter of the bushing. The coefficient of friction of the sliding layer is less than the coefficient of friction of the gripping layer, thereby reducing friction between the pin and associated aperture. With the inventive universal joint, the intermediate cup may be formed of metal for additional strength. The layered bushing allows the pin to pivot relative the intermediate cup, providing a smooth feel for the operator of the vehicle and reducing lash at the pivot connection.

BRIEF DESCRIPTION OF THE DRAWINGS

Other objects, features and advantages of the present invention will become more fully apparent from the following detailed description of the preferred embodiment, the appended claims and in the accompanying drawings in which:

FIG. 1 is a perspective view of a vehicle steering column having a universal joint for tilting of a steering wheel in accordance with the teachings of the preferred embodiment of this invention.

FIG. 2 is a fragmented perspective view of the universal joint found in FIG. 1.

FIG. 3 is a cross-sectional view along lines 3—3 of FIG. 2.

FIG. 4 is a perspective view of a layered bushing used in the universal joint of FIG. 2.

DETAILED DESCRIPTION OF THE PREFERRED EMBODIMENT

Referring now to the drawings wherein like reference numerals are used to identify identical components in various views, FIG. 1 is a perspective view of a vehicle interior illustrating a vehicle control panel 10 including a tilt steering column 12. Tilt steering column 12 includes a universal joint 14, shown in FIG. 2. Due to universal joint 14, a steering wheel 16 may be tilted up along arrow 18, or down along arrow 20.

Referring now to FIG. 2, universal joint 14 is comprised of hub 22, a long pin 24, an intermediate cup 26, a pair of short pins 28, a bell yoke 30, and a plurality of layered bushings 32. Hub 22 is at one end of a driven shaft 34. Driven shaft 34 extends outwardly from vehicle control panel 10 and is rotated by a steering shaft 36 through universal joint 14. Steering shaft 36 includes steering wheel 16 at one end thereof, and bell yoke 30 at the other end. Intermediate cup 26 defines a cavity 38 for receiving hub 22. Bell yoke 30 defines a cavity 40 for receiving intermediate cup 26. Intermediate cup 26 is interposed between hub 22 and bell yoke 30, and is secured to hub 22 and bell yoke by pins 24 and 28. Intermediate cup 26 pivots with respect to pins 24 and 28 to transmit rotation from steering shaft 36 to driven shaft 34 while steering column 12 is straight or tilted.

Referring to FIG. 3, a first pivot axis A—A is provided between hub 22 and intermediate cup 26 by long pin 24, and a second pivot axis B—B is provided between intermediate cup 26 by pair of short pins 28. Second pivot axis B—B is spaced 90 degrees from first pivot axis A—A. Long pin 24 is received in a bore 42 which transverses hub 22, rigidly securing pin 24 to hub 22 by an interference fit. Due to the interference fit, long pin 24 does not move with respect to hub 22 of driven shaft 34. Each end 44 of long pin 24 further extends into an aperture 46 of intermediate cup 26 forming a pivot connection. Layered bushing 32 is compressed between long pin 24 and intermediate cup 26 to facilitate pivoting of pin 24 with respect to intermediate cup 26 along axis A—A.

Intermediate cup 26 is received in cavity 40 defined by bell yoke 30. The pair of axially aligned short pins 28 extend into apertures 48 formed in opposing portions of side wall 50 of bell yoke 30. Bell yoke 30 is the receiving end of steering shaft 36 for intermediate cup 26.

It is to be understood that the following description applies to each pin of the pair of pins 28. Short pin 28 forms an interference fit with aperture 48 of bell yoke 30. Due to the interference fit, short pin 28 does not move with respect to bell yoke 30. An opposite end 52 of short pin 28 extends into an aperture 54 of intermediate cup 26 forming a pivot connection. Layered bushing 32 is compressed between short pin 28 and intermediate cup 26 to facilitate pivoting of short pin 28 relative to intermediate cup 26 along axis B—B. Pins 24 and 28 and associated apertures 46 and 54 have generally circular cross-sections for pivoting.

As seen in FIG. 4, layered bushing 32 is preferably cylindrically shaped and sized to fit snugly between long pin 24 and associated apertures 46. Another layered bushing 32 fits between short pins 28 and associated apertures 54. Each layered bushing 32 is formed of an axially extending main body 56. Main body 56 is coated on a radially outer surface to form a gripping layer 58, and coated on a radially inner surface to form a sliding layer 60. Sliding layer 60 and gripping layer 58 are integral to bushing 32.

Gripping layer 58 contacts intermediate cup 26, while sliding layer 60 contacts associated pin 24 and 28. Sliding layer 60 provides for less frictional resistance than gripping layer 58. The coefficient of friction of sliding layer 60 is less than the coefficient of friction of gripping layer 58 with respect to the associated contact surfaces. Sliding layer 60 thereby provides less frictional resistance between each pin and associated aperture of intermediate cup 26 for pivoting. The sliding layer 60 is preferably provided at the inner diameter of layered bushing 32 so that universal joint 14 may withstand a higher shear load. In other embodiments, however, the gripping layer may be provided along the inner diameter, shown as layer 60, and the sliding layer may be provided along the outer diameter, shown as layer 58.

In one known embodiment, main body 56 is bronze mesh, gripping layer 58 is plastic, and sliding layer 60 is polytetrafluoroethylene a material commercially known as TEFLON™. When layered bushing 32 is compressed between a pin and associated aperture, compression occurs primarily in main body 56 and gripping layer 58. Because body 56 is formed of a mesh type material, the layers 58 and 60 partially overlap through the mesh. In the preferred embodiment, the TEFLON™ layer adheres to both the bronze mesh and the plastic layer.

In a preferred embodiment, driven shaft 34, hub 22, steering shaft 36, intermediate cup 26, and bell yoke 30 are formed of metal. Preferably, intermediate cup 26 is formed of cold headed, or cast metal. Layered bushings 32 allow intermediate cup 26 to be formed of metal, while providing a pivot connection with long pin 24 and pair of short pins 28. Otherwise, a ball bearing or similar assembly is required between intermediate cup 26 and pins 24 and 28, adding significant expense to universal joint 14. Layered bushing 32 therefore provides a cost effective alternative to ball bearings when a metal intermediate cup 26 is used. Universal joint 14 has superior strength, as compared to a universal joint having a plastic intermediate cup. Universal joint 14 provides an operator with a smooth feel when rotating steering wheel 16 with little or no lash at the pivot connection.

Further, layered bushing 32 allows intermediate cup 26, pins 24 and 28, and associated apertures 46 and 54 to be formed with less tolerance. More specifically, the clearance between pins 24 and 28, and associated apertures 46 and 54 may be less than the thickness of layered bushing 32. Any interference is absorbed by layered bushing 32, because layered bushing 32 is compressed within the apertures 46 and 54. In some instances, no clearance is provided between the pins and associated apertures. In addition, the use of layered bushing 32 greatly increases the options for the types of materials that may be used on the various components of universal joint 14. The advantages of a gripping material, a sliding material and a compressible material are included in a single, integral bushing for use in a universal joint.

In one known embodiment, the outer diameter of bell yoke 30 is approximately 1.5 inches (38.1 mm), the outer diameter of intermediate cup 26 is approximately 1.1 inches (27.9 mm), the outer diameters of long pin 24 and short pin 28 are approximately 0.3 inch (7.6 mm), the diameters of apertures 46 and 54 are approximately 0.38 inch (9.7 mm), the length of long pin 24 is approximately 1.1 inch (27.9 mm) and the length of short pin 28 is approximately 0.5 inch (12.7 mm).

While the present invention has been disclosed with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. A universal joint comprising:

a driven shaft including a hub at one end thereof, said hub having a transverse bore therethrough;

a first pin extending through the transverse bore in said hub, said first pin forming an interference fit between said first pin and said hub to thereby prevent said first pin from moving with respect to said hub;

an intermediate cup formed entirely of metal having first and second apertures therein, said intermediate cup defining a cavity, said hub being received in said cavity of said intermediate cup, said first pin extending into the first aperture in said intermediate cup;

a driving shaft including a bell yoke at one end thereof, said bell yoke defining a cavity, said intermediate cup being received in said cavity of said bell yoke;

a second pin extending from said bell yoke into the second aperture in said intermediate cup;

a first tubular bushing providing relative sliding rotation between said first pin and said intermediate cup;

a second tubular bushing providing relative sliding rotation between said second pin and said intermediate cup, wherein said first bushing and said second bushing are resiliently radially compressed between said first pin and the first aperture in said intermediate cup, and said second pin and the second aperture in said intermediate cup, respectively, each of said first and second bushings having a radially-disposed inner layer and a radially-disposed outer layer with a mesh body therebetween, wherein each of the outer layers is a plastic gripping layer with respect to the intermediate cup and each of the inner layers is a polytetrafluoroethylene sliding layer with respect to its associated pin.

2. The universal joint of claim 1, wherein said hub and said bell yoke are formed of metal.

3. The universal joint of claim 1, wherein said mesh bodies are made of bronze mesh.

4. The universal joint of claim 1, wherein said mesh bodies are made of bronze mesh, and each layer formed of polytetrafluoroethylene adheres to both the bronze mesh and the layer formed of plastic.

5. The universal joint of claim 1, wherein the radial compression of the tubular bushings occurs primarily in the mesh body and the plastic gripping layer.

6. A universal joint comprising:

a driven shaft including a hub at one end thereof, said hub having a transverse bore therethrough;

a first pin extending through the transverse bore in said hub, said first pin forming an interference fit between said first pin and said hub to thereby prevent said first pin from moving with respect to said hub;

an intermediate cup formed entirely of metal having first and second apertures therein, said intermediate cup defining a cavity, said hub being received in said cavity of said intermediate cup, said first pin extending into the first aperture in said intermediate cup;

a driving shaft including a bell yoke at one end thereof, said bell yoke defining a cavity, said intermediate cup being received in said cavity of said bell yoke;

a second pin extending from said bell yoke into the second aperture in said intermediate cup;

a first tubular bushing providing relative sliding rotation between said first pin and said intermediate cup;

a second tubular bushing providing relative sliding rotation between said second pin and said intermediate cup, wherein said first bushing and said second bushing are resiliently radially compressed between said first pin and the first aperture in said intermediate cup, and said second pin and the second aperture in said intermediate cup, respectively, each of said first and second bushings having a radially-disposed inner layer and a radially-disposed outer layer with a mesh body therebetween, wherein each of the outer layers is a plastic gripping layer with respect to the intermediate cup and each of the inner layers is a sliding layer with respect to its associated pin.

* * * * *